US008856073B2

(12) United States Patent
Matsuzawa

(10) Patent No.: US 8,856,073 B2
(45) Date of Patent: Oct. 7, 2014

(54) DATA SYNCHRONIZATION AMONG FILE STORAGES USING STUB FILES

(75) Inventor: Keiichi Matsuzawa, Arlington, MA (US)

(73) Assignee: Hitachi, Ltd., Tokyo (JP)

( * ) Notice: Subject to any disclaimer, the term of this patent is extended or adjusted under 35 U.S.C. 154(b) by 19 days.

(21) Appl. No.: 12/967,677

(22) Filed: Dec. 14, 2010

(65) Prior Publication Data

US 2012/0150799 A1    Jun. 14, 2012

(51) Int. Cl.
G06F 17/30    (2006.01)
G06F 7/00    (2006.01)

(52) U.S. Cl.
USPC .......................................... 707/622

(58) Field of Classification Search
USPC .......................................... 707/622
See application file for complete search history.

(56) References Cited

U.S. PATENT DOCUMENTS

| 6,938,039 | B1 | 8/2005 | Bober et al. | |
| 6,959,310 | B2 | 10/2005 | Eshel et al. | |
| 7,330,950 | B2 * | 2/2008 | Matsunami et al. | 711/165 |
| 7,587,436 | B2 | 9/2009 | Agetsuma et al. | |
| 7,603,397 | B1 | 10/2009 | Hagerstrom et al. | |
| 2006/0129537 | A1 | 6/2006 | Torii et al. | |
| 2006/0212481 | A1 | 9/2006 | Stacey et al. | |
| 2009/0044046 | A1 * | 2/2009 | Yamasaki | 714/6 |
| 2009/0112947 | A1 * | 4/2009 | Bourbonnais et al. | 707/204 |
| 2009/0248762 | A1 * | 10/2009 | Prahlad et al. | 707/204 |
| 2009/0271451 | A1 | 10/2009 | Young et al. | |
| 2009/0313311 | A1 * | 12/2009 | Hoffmann et al. | 707/204 |
| 2011/0078112 | A1 * | 3/2011 | Takata et al. | 707/622 |

FOREIGN PATENT DOCUMENTS

| EP | 2178005 | 4/2010 |
| JP | 2005316708 | 11/2005 |
| JP | 2008040699 | 2/2008 |

OTHER PUBLICATIONS

Randy Urbano: Oracle Database Advanced Replication, 10g Release 1 (10.1), Dec. 2003 Oracle Corporation.*

* cited by examiner

Primary Examiner — Kuen Lu
(74) Attorney, Agent, or Firm — Mattingly & Malur, PC

(57) ABSTRACT

A method switches file server from old file server to new file server which are coupled via a backend network and provides data synchronization. The old file server and new file server are coupled with one or more host computers via a frontend network to direct input/output (I/O) requests from the one or more host computers. The method comprises creating stub files in the new file server, the stub files including stub information indicating location of data in the old file server; switching I/O requests directed to old file server to I/O requests directed to the new file server; checking whether the new file server has any stub files; and, if the new file server has one or more stub files, recalling data corresponding to the one or more stub files from the old file server according to the stub information to replace the one or more stub files.

14 Claims, 18 Drawing Sheets

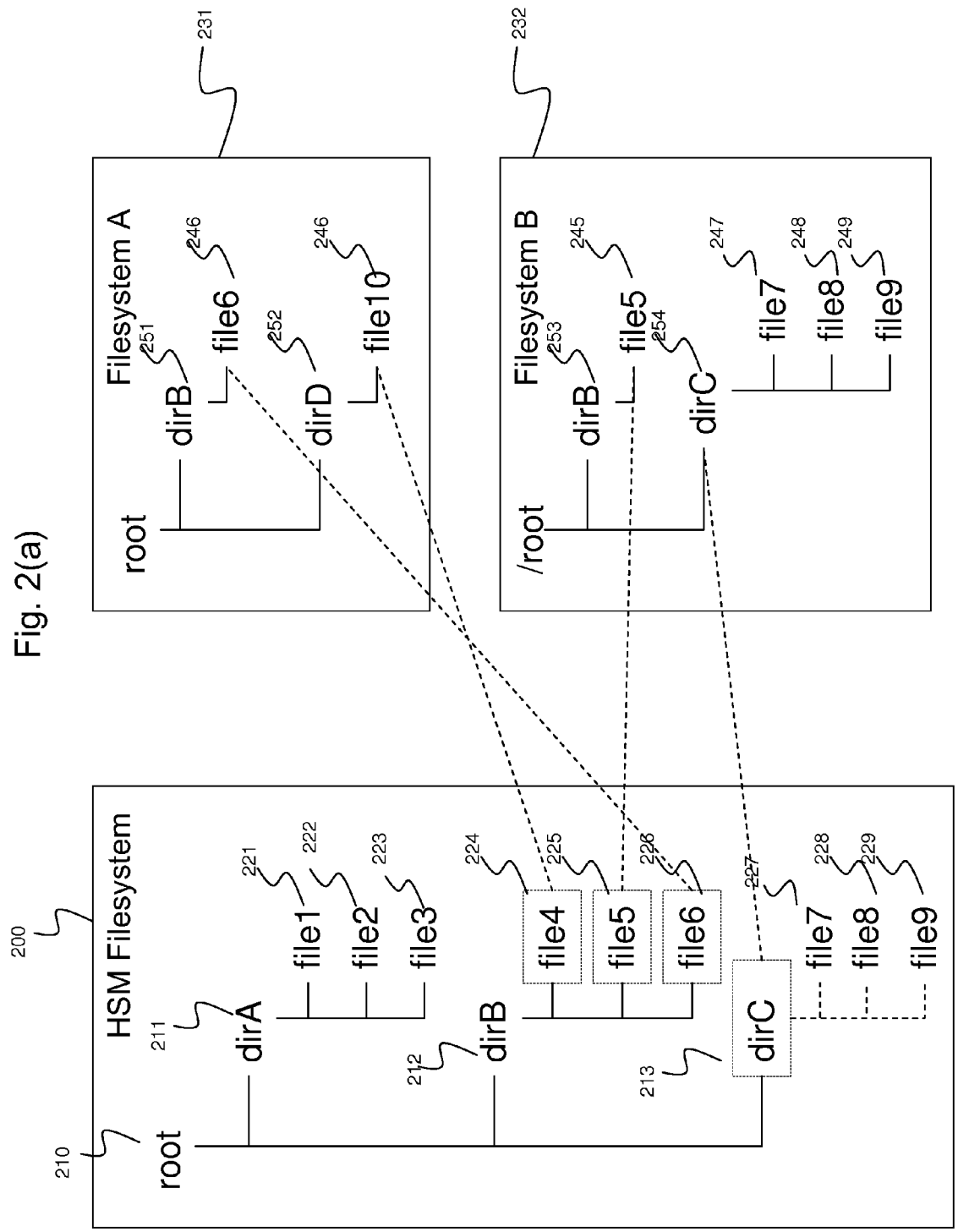

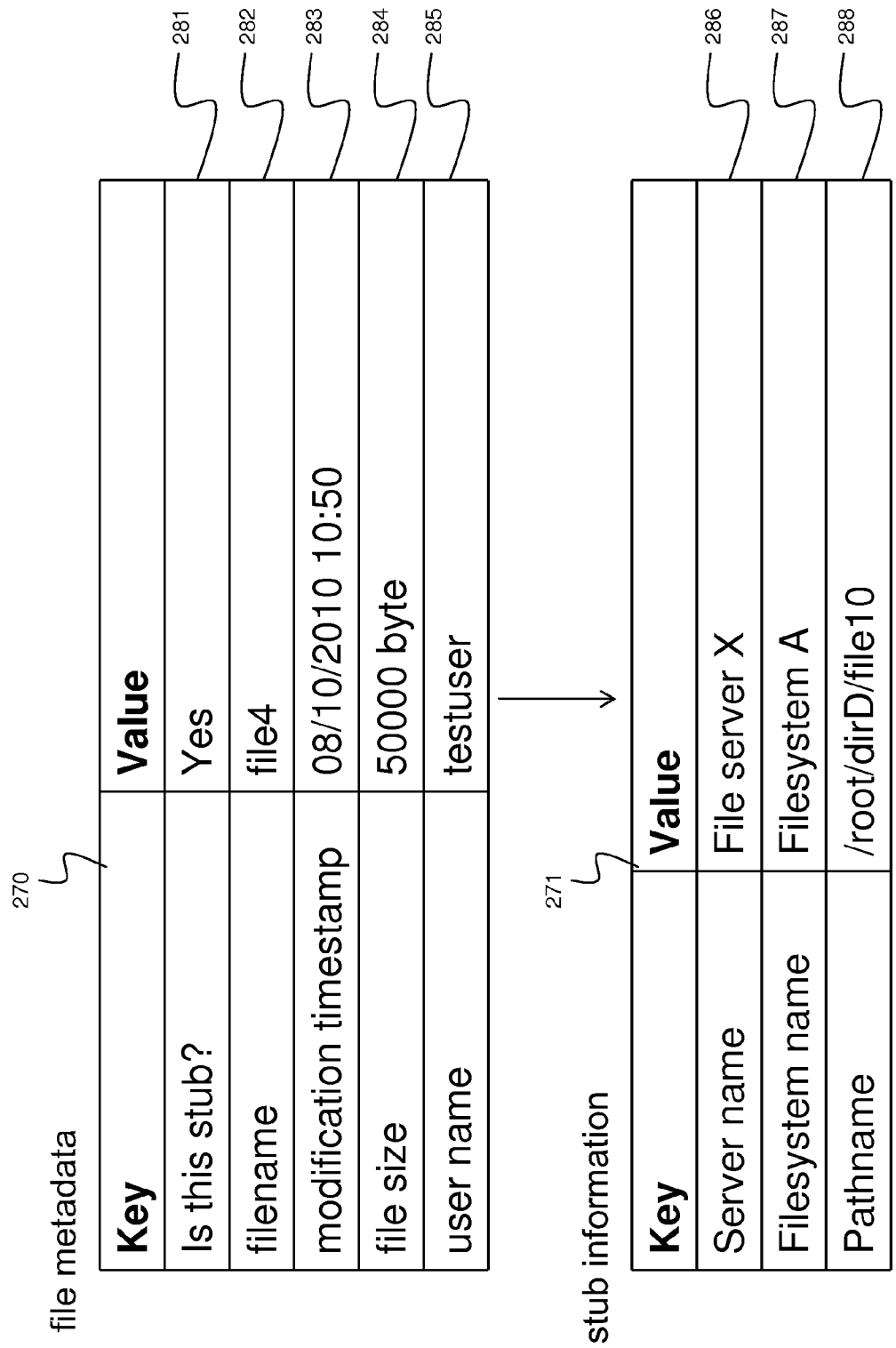

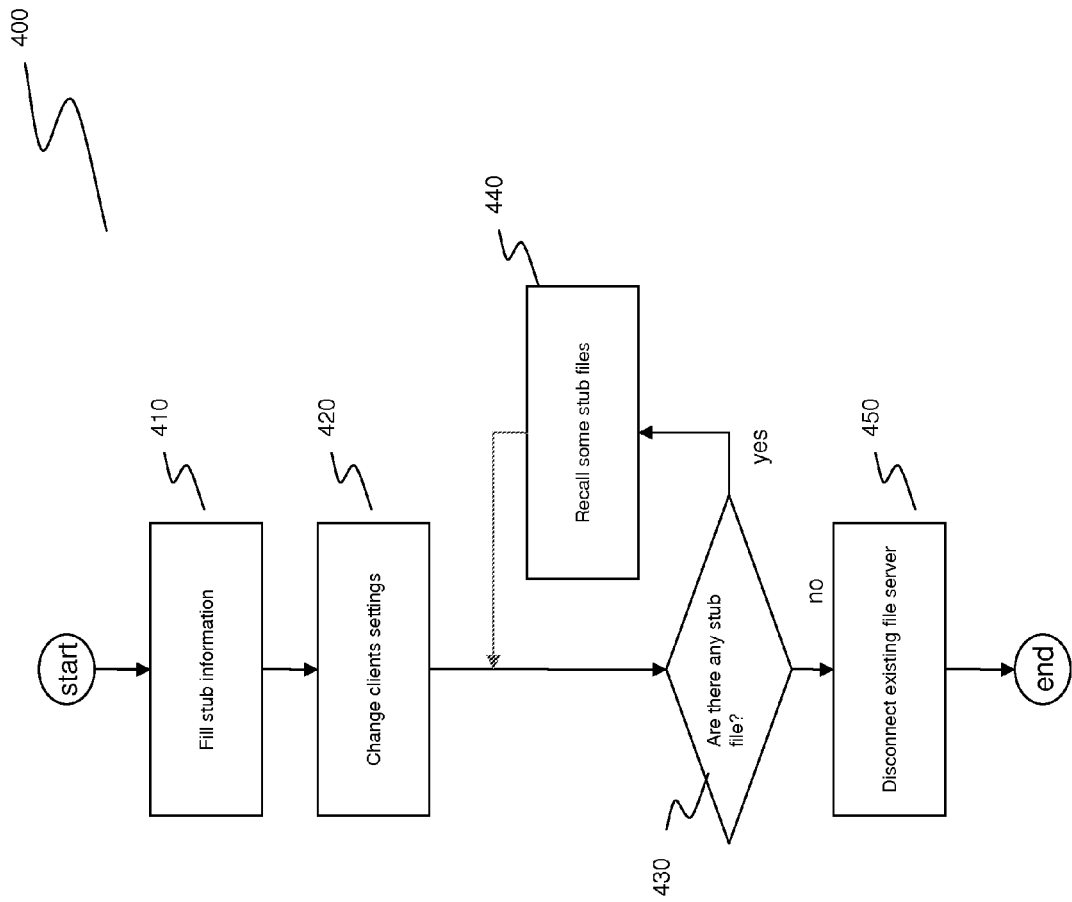

Fig. 5 file metadata — 500

| Key | Value |
|---|---|
| Is this stub? | Yes |
| Is this latest? | No |
| filename | file4 |
| modification timestamp | 08/10/2010 10:50 |
| file size | 50000 byte |
| user name | testuser |

511, 512, 513, 514

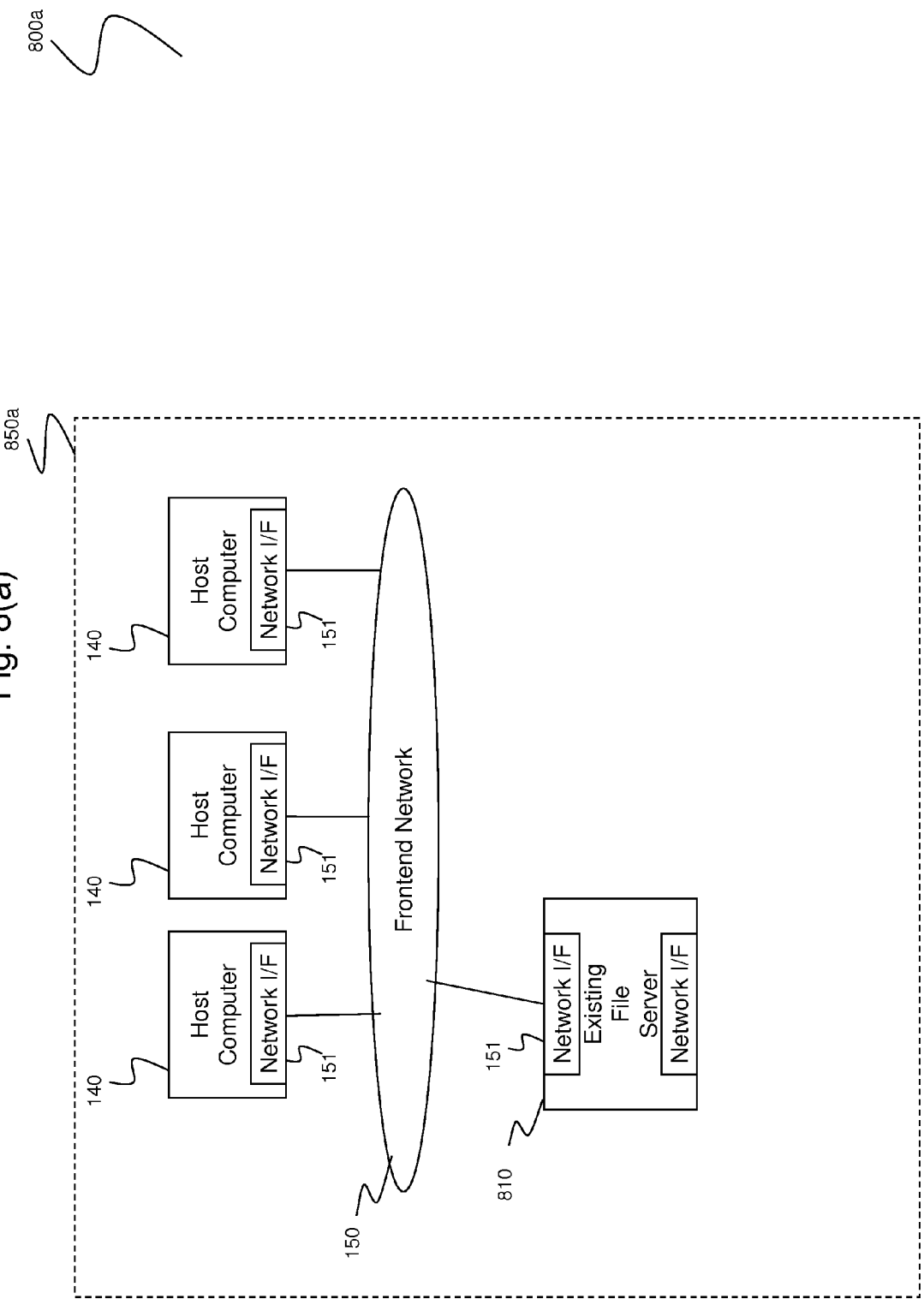

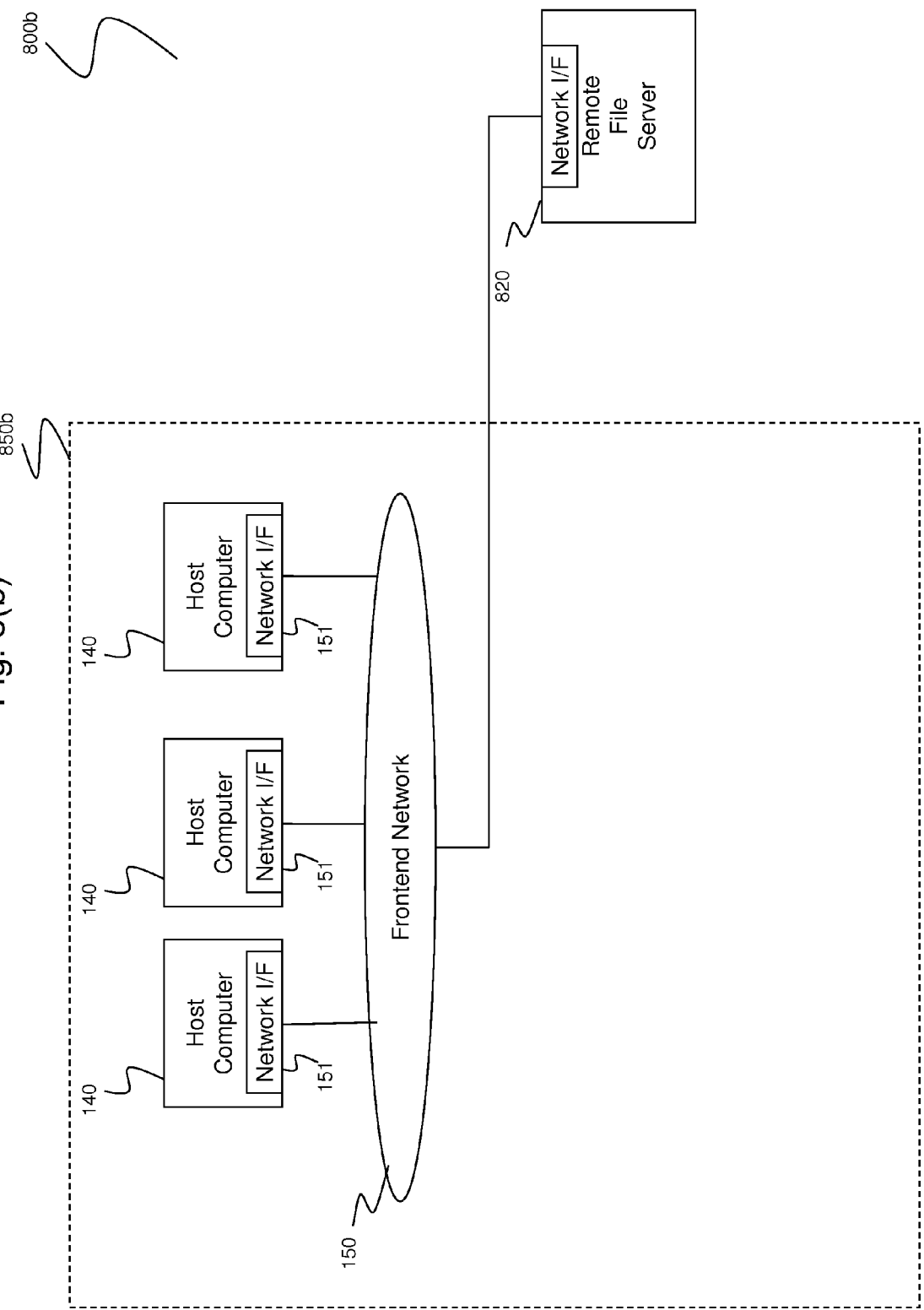

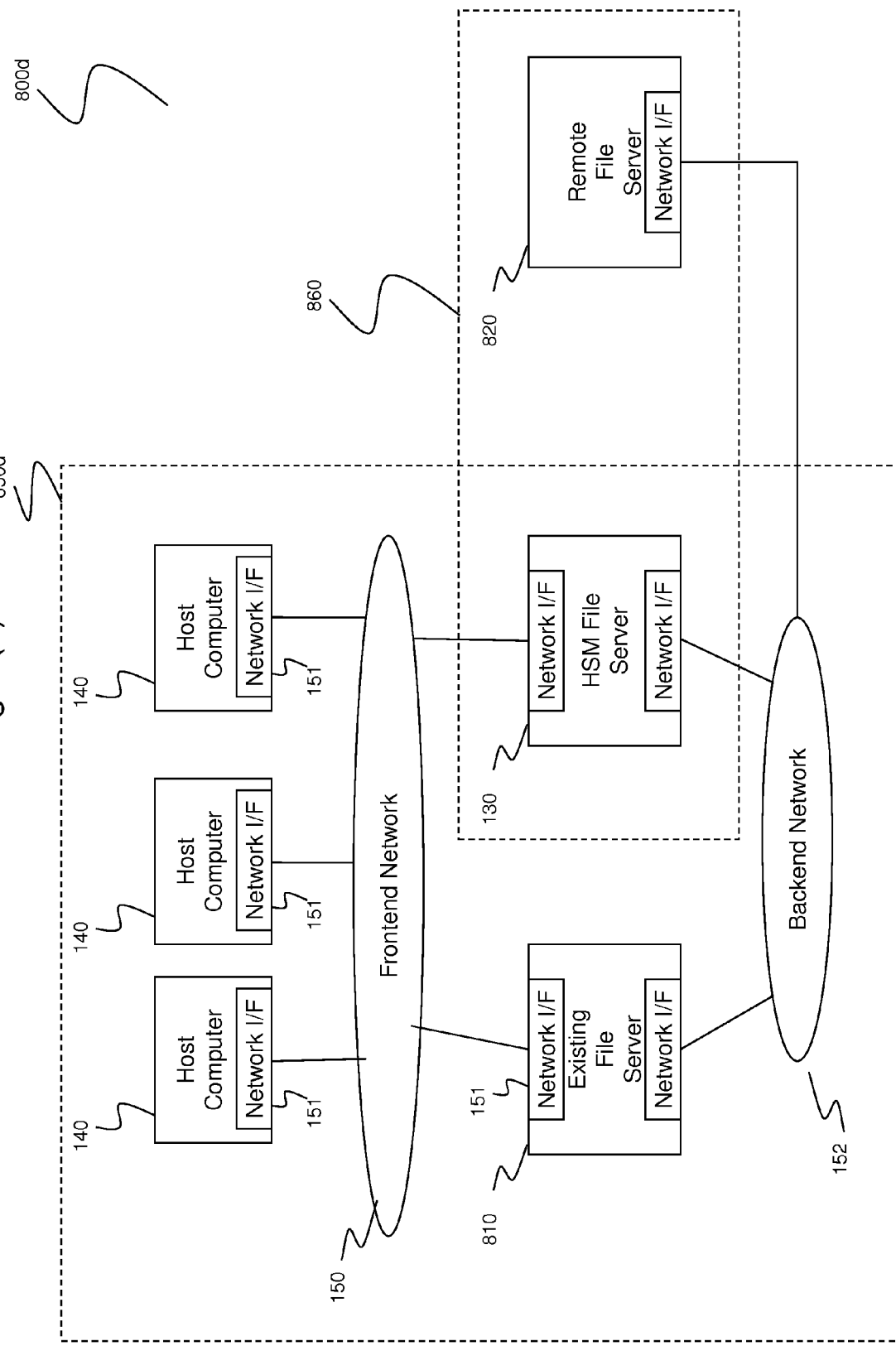

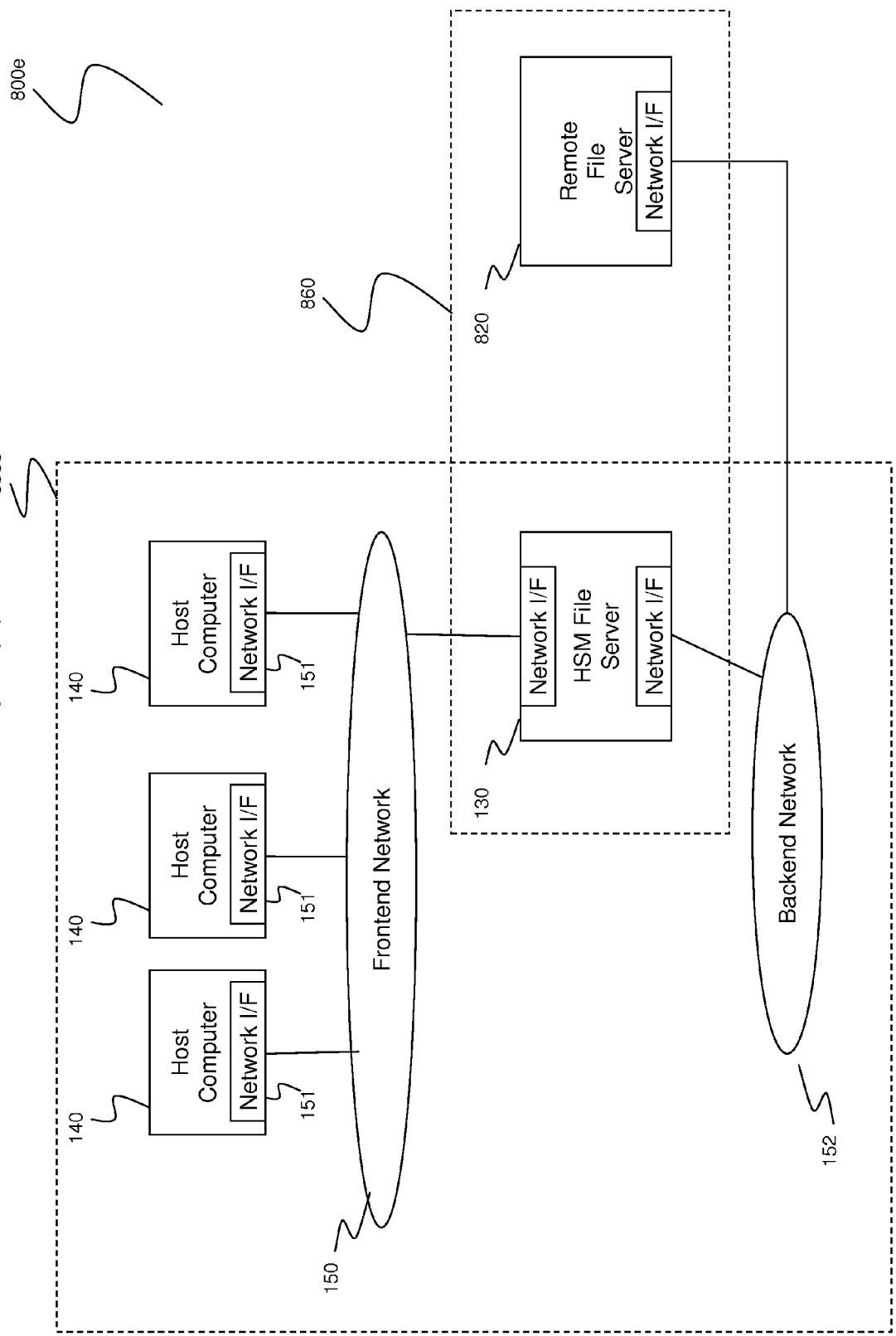

DATA SYNCHRONIZATION AMONG FILE STORAGES USING STUB FILES

BACKGROUND OF THE INVENTION

The present invention relates generally to storage systems and, more particularly, to methods and apparatus for transition among file storage systems.

When computer system users replace old storage systems with new ones or construct DR (Disaster Recovery) for BS (Business Continuity), data synchronization among storage systems is needed to take over the workload. Recent recording media have much higher capacity than before. Thus, it takes much more time, sometimes longer than a week, to synchronize data between storage systems. Users do not want to stop their business for such a long time to wait for the synchronization to complete; they would like to continue their business even during synchronization.

BRIEF SUMMARY OF THE INVENTION

Exemplary embodiments of the invention provide methods and apparatus to enable seamless transition and data synchronization among file storage systems. Specific embodiments are directed to file storage system apparatus supporting file-level HSM (Hierarchical Storage Management), and are designed to enable non-disruptive file storage system transition. As file systems become larger, more time is needed to transfer data between old and new file servers. Users want to continue their business during the data transfer. Using file-level HSM, the HSM file server redirects file I/O requests based on the status of each file data copy, and enables non-disruptive file server migration.

In specific embodiments, the file storage system has stub files that store only metadata showing the position of true data of file. This disclosure reveals two techniques for two different situations.

The first situation is that the users start to use the new empty file storage system. When the users start to use the new system, the new system analyzes the original old file storage system, which is to be replaced, and creates such stub files at first. Then the clients of the storage systems switch their I/O from the old system to the new system. The new system reads file data from the old system and replaces their stub files with data read from the old system little by little. When the new system receives I/O requests from the clients, the new system processes the requests onto the requested file if the file is already replaced and not a stub file at that time. If the requested file is stored in the new system as stub, the new system redirects the I/O requests to the old system or replaces the stub file with the file data read from the old system immediately.

The second situation is that the new file storage system has mostly the same files but some of the files are different because the new system had the snapshot of the old one at some time but the users' business overwrites some files during installation of the new system. In this situation, the new file storage system may have the same file as that in the old system or the new file storage system may have a different file (overwritten file) so that the new system needs data synchronization. According to the second technique, the new system checks the timestamp of the target file(s). If the timestamp of a file of the old system is older than that when the snapshot was taken, the new system can judge that the file was not overwritten after the snapshot so that the storage systems does not need to synchronize the file, and hence can avoid useless data synchronization and can finish synchronization earlier. If the timestamp of the file is newer than that of the snapshot, the file was overwritten so that the file must be copied to the new system. The copy process is the same as that of the first situation.

In both situations, these items (stub files, I/O redirection, checking file timestamp, and immediate replacement of stub files) enable clients to access all files via the new file storage system regardless of whether the target file is synchronized or not.

An aspect of the present invention is directed to a method for switching file server from an old file server to a new file server which are coupled via a backend network and for data synchronization. The old file server and the new file server are coupled with one or more host computers via a frontend network to direct input/output (I/O) requests from the one or more host computers. The method comprises creating stub files in the new file server, the stub files including stub information indicating location of data in the old file server; switching I/O requests directed to the old file server to I/O requests directed to the new file server; checking whether the new file server has any stub files; and, if the new file server has one or more stub files, recalling data corresponding to the one or more stub files from the old file server according to the stub information to replace the one or more stub files.

In some embodiments, the method further comprises continuing I/O requests from the one or more host computers to the file servers during the switching, checking, and recalling. The method further comprises, prior to creating stub files in the new file server: copying data from the old file server to a storage media and, after the copying is completed, installing the storage media containing the copied data in the new file server; storing in the new file server a copy date timestamp corresponding to the copying of data from the old file server to the storage media; checking a flag, corresponding to each file or directory in the new file server, as NO indicating that the data in the file or directory are not latest in the new file server; performing the switching of I/O requests directed to the old file server to I/O requests directed to the new file server; checking whether any file or directory in the new file server has a corresponding flag NO indicating that the data therein are not latest in the new file server; and, for each file or directory with a NO flag, checking the flag as YES in the new file server, and if the copy date timestamp for data in the file or directory is older than a target timestamp of the corresponding file or directory in the old file server indicating that data of the corresponding file or directory in the old file server has been overwritten at the target timestamp which is newer than the copy date timestamp, removing data of the file or directory in the new file server and performing the creating stub files in the new file server for the file or directory.

In specific embodiments, the method performs the following in parallel for different files or directories: checking whether any file or directory in the new file server has a corresponding flag NO; for each file or directory with a NO flag, checking the flag as YES in the new file server and removing data of the file or directory in the new file server and performing the creating stub files in the new file server for the file or directory; and recalling data corresponding to the one or more stub files from the file server having the data according to the stub information to replace the one or more stub files if the new file server has one or more stub files. An external file server is coupled with the new file server via the backend network, and the method further comprises, after recalling data corresponding to the one or more stub files from the file server having the data according to the stub information, migrating files of the recalled data to the external file server. The method performs the following in parallel for different files or directories: checking whether any file or directory in the new file server has a corresponding flag NO; for each file or directory with a NO flag, checking the flag as YES in the new file server and removing data of the file or directory in the new file server and performing the creating stub files in the new file server for the file or directory; recalling data corresponding to the one or more stub files from the file server having the data according to the stub information to replace the one or more stub files if the new file server has one or more stub files; and migrating files of the recalled data to the external file server.

In some embodiments, an external file server is coupled with the new file server via the backend network, and the method further comprises, after recalling data corresponding to the one or more stub files from the file server having the data according to the stub information, migrating files of the recalled data to the external file server. The method further comprises receiving, by the new file server, an I/O request for a file from one of the one or more host computers; determining whether the file of the I/O request is a stub file in the new file server; if the file is not a stub file and the I/O request is not a write request, processing the I/O request to access data in the new file server; if the file is a stub file and the I/O request is not a write request, recalling data corresponding to the stub file from the old file server according to the stub information to replace the one or more stub files; and, if the I/O request is a write request, writing data of the write request to the new file server. The method further comprises migrating data of the I/O request to an external file server.

In specific embodiments, the method further comprises creating one or more stub directories in the new file server, the one or more stub directories including stub information indicating location of data in one or more directories in the old file server; receiving, by the new file server, an I/O request for a directory from one of the one or more host computers; determining whether the directory of the I/O request is a stub directory in the new file server; if the directory is not a stub directory and the I/O request is not a write request, processing the I/O request to access data in the new file server; if the file is a stub directory and the I/O request is not a write request, recalling data corresponding to the stub directory from the old file server according to the stub information to replace the one or more stub files; and, if the I/O request is a write request, writing data of the write request to the new file server.

Another aspect of the invention is directed to a new file server in an information system which includes an old file coupled with the new file server via a backend network; one or more host computers; and a frontend network coupling the one or more host computers with the old and new file servers. The new file server comprises a processor; a memory; and a data synchronization module configured to: create stub files in the new file server, the stub files including stub information indicating location of data in the old file server, making it possible to switch I/O requests directed to the old file server to I/O requests directed to the new file server; and, upon receiving an I/O request by the new file server, check whether the new file server has any stub files and, if the new file server has one or more stub files, recall data corresponding to the one or more stub files from the old file server according to the stub information to replace the one or more stub files.

In some embodiments, the new file server further comprises a storage media containing data copied from the old file server and installed in the new file server. The memory stores a copy date timestamp corresponding to the copying of data from the old file server to the storage media. The new file server includes a hierarchical storage management module which is configured, prior to creating stub files in the new file server by the data synchronization module, to: check a flag, corresponding to each file or directory in the new file server, as NO indicating that the data in the file or directory are not latest in the new file server; check whether any file or directory in the new file server has a corresponding flag NO indicating that the data therein are not latest in the new file server; and, for each file or directory with a NO flag, check the flag as YES in the new file server, and if the copy date timestamp for data in the file or directory is older than a target timestamp of the corresponding file or directory in the old file server indicating that data of the corresponding file or directory in the old file server has been overwritten at the target timestamp which is newer than the copy date timestamp, remove data of the file or directory in the new file server and create stub files in the new file server for the file or directory.

In accordance with another aspect of this invention, an information system comprises an old file server; a new file server; a backend network coupling the old file server and the new file server; one or more host computers; and a frontend network coupling the one or more host computers with the old and new file servers. The new file server is configured to: create stub files in the new file server, the stub files including stub information indicating location of data in the old file server, making it possible to switch I/O requests directed to the old file server to I/O requests directed to the new file server; and, upon receiving an I/O request by the new file server, check whether the new file server has any stub files and, if the new file server has one or more stub files, recall data corresponding to the one or more stub files from the old file server according to the stub information to replace the one or more stub files.

These and other features and advantages of the present invention will become apparent to those of ordinary skill in the art in view of the following detailed description of the specific embodiments.

BRIEF DESCRIPTION OF THE DRAWINGS

FIGS. 2(a) and 2(b) show an example of implementation of file-level HSM using stub files.

FIG. 4 illustrates an example of a process flow for data synchronization and file server switching according to the first embodiment.

FIG. 5 illustrates an example of the metadata.

DETAILED DESCRIPTION OF THE INVENTION

Figure 1A:
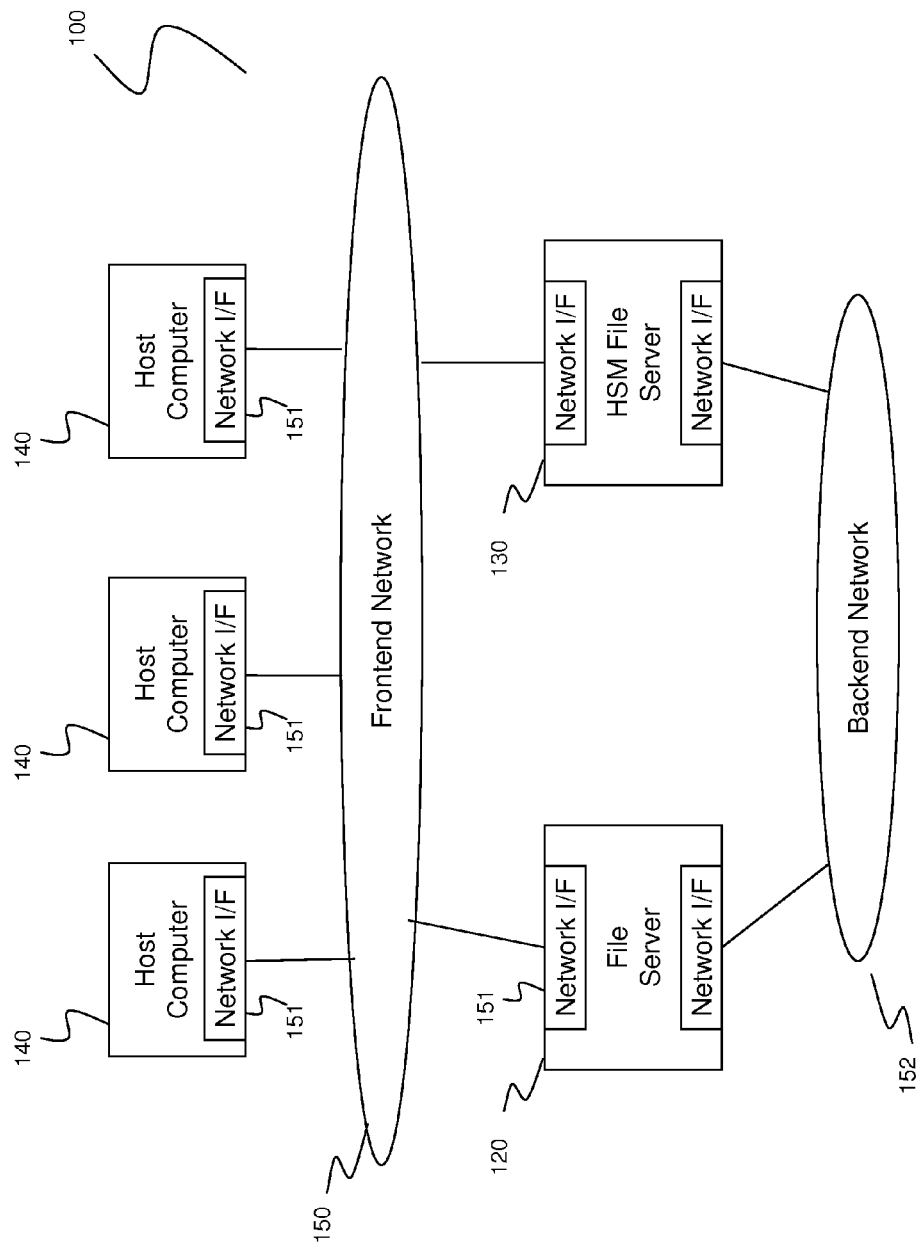
FIGS. 1(a), (b), (c), and (d) show an example of the information system overview in which the method and apparatus of the invention may be applied according to the first embodiment.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for enabling seamless transition and data synchronization among file storage systems.

First Embodiment

A. System Configuration

FIGS. 1(a), (b), (c), and (d) show an example of the information system overview 100 in which the method and apparatus of the invention may be applied. The information system 100 includes a file server 120, a HSM file server 130, a frontend network 150, a backend network 152, and one or more host computers 140.

Figure 1B:
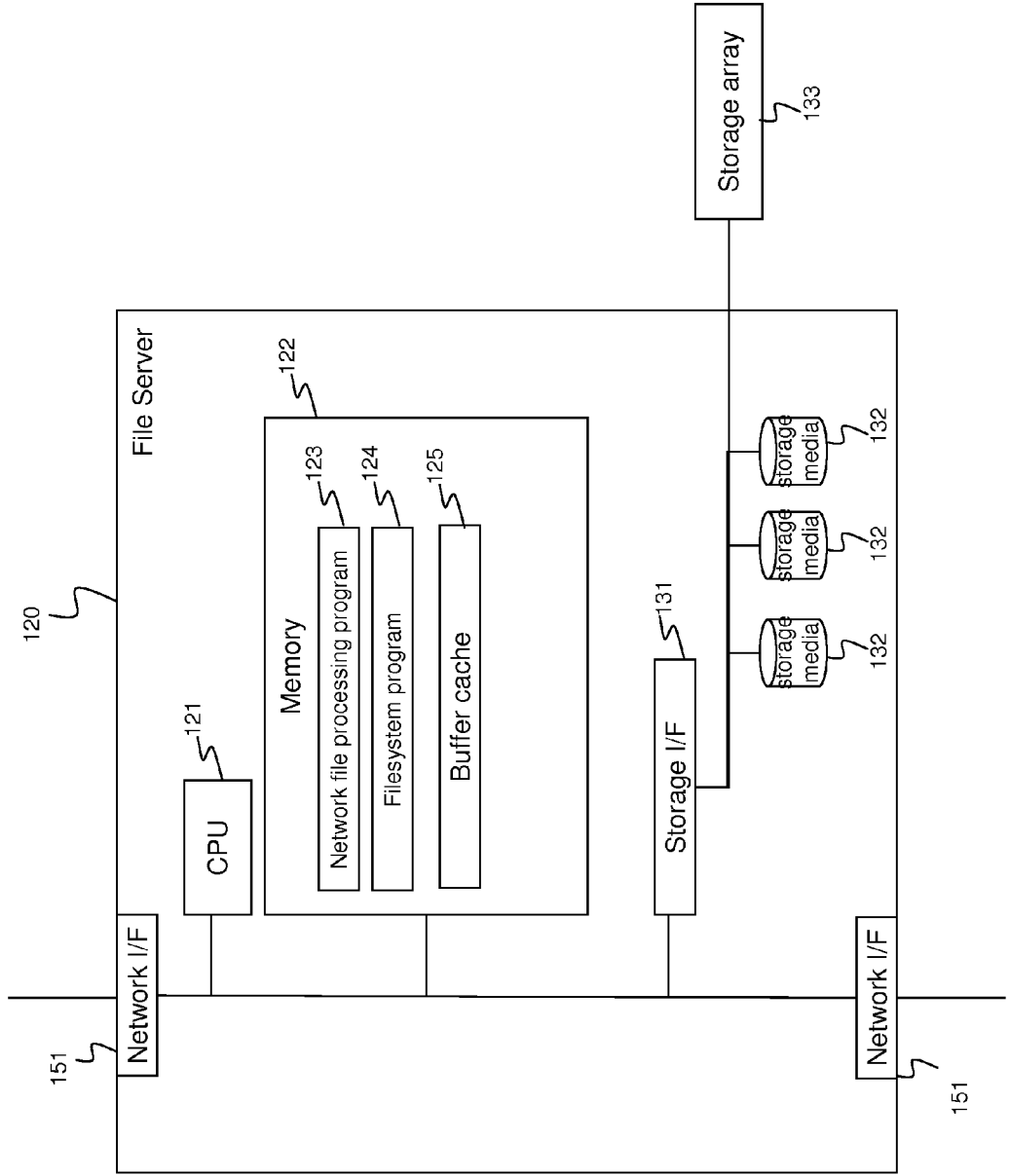

The file server 120 is the old file server from which users of the information system 100 want to transit to the newer file server 130. As seen in FIG. 1(b), the file server 120 includes a CPU 121, a memory 122, a storage interface 131, and network interfaces 151. The file server 120 may also have storage media 132. The CPU 121 controls the devices in the file server 120 using the programs in the memory 122. The memory 122 has programs and cache. The network interfaces 151 are used to communicate with the host computers 140 via the frontend network 150 and other file servers including the HSM file server 130 via the backend network 152. The CPU 121 receives file I/O requests from the host computers 140 and returns the results via the network interface 151 by referring to the network file processing program 123. The CPU 121 processes file I/O requests and reads/writes data from/onto the storage media 132 or a storage array 133 connected via the storage interface 131 by referring to the file system program 124. FC (Fibre Channel), SATA (Serial Attached Technology Attachment), SAS (Serial attached SCSI), IDE (Integrated Device Electronics), or other interfaces are used for communication between the CPU 121 and the storage interface 131. The file server 120 can have many kinds of storage media 132 such as HDD (Hard Disk Drive), SSD (Solid State Drive), flush memories, optical disks, magnetic tapes, and so on. Their array by RAID (Redundant Array of Independent Disk) technology is also available for storage media. Furthermore, the external storage array 133 can be used instead of the internal storage media 132. The CPU 121 can use the memory 122 for other usage such as a buffer cache 125. This buffer cache 125 stores cache data of the storage media 132 to achieve fast data access by reducing the I/O request to the storage media 132.

Figure 1C:
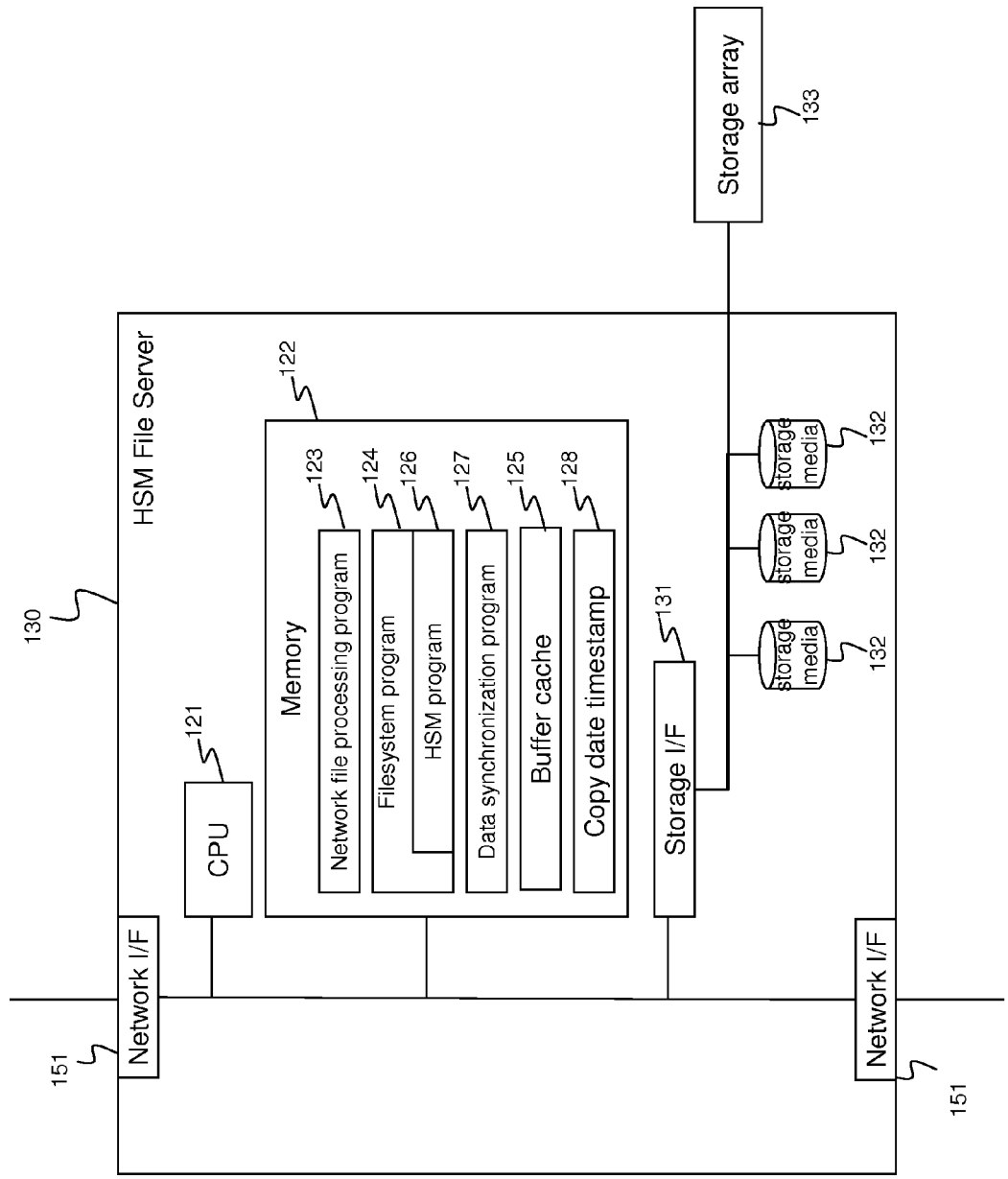

The HSM file server 130 is the new file server to which users of the information system 100 want to transit from the old file server 120. As seen in FIG. 1(c), this new file server 130 is almost the same as the old file server 120 but it has additional components in the memory 120: HSM program 126 and data synchronization program 127. The CPU 121 processes file-level HSM by using stub files by referring to the HSM program 126 inside the file system program 124. The CPU 121 copies files from the old file server 120 to this new file server 130 to synchronize data between the two file servers 120 and 130 using the data synchronization program 127. This synchronization can be done periodically, for example, every night when the information system 100 has no workload, or whenever a user or some other program such as the HSM program 126 requires. This embodiment does not use the copy date timestamp 128. U.S. Pat. No. 7,330,950 discloses a per-file hierarchical storage management method based on stub files and shows an example of the structure of stub files.

For the frontend network 150, the host computers 140 issue file I/O to the file server 120 and the HSM file server 130 via the frontend network 150 by using the network interface 151. There are some common protocol for file I/O interface via networks such as NFS (Network File System), CIFS (Common Internet File System), and AFP (Apple Filing Protocol). Furthermore, each computer can communicate with other computers for various purposes.

For the backend network 152, the file server 120 and the HSM file server communicate via the backend network 152 by using the network interface 151. This backend network 152 is used to migrate data, exchange metadata, or serve other various purposes. The backend network 152 does not have to be separate from the frontend network 150. It is possible to merge both networks 150 and 152.

Figure 1D:
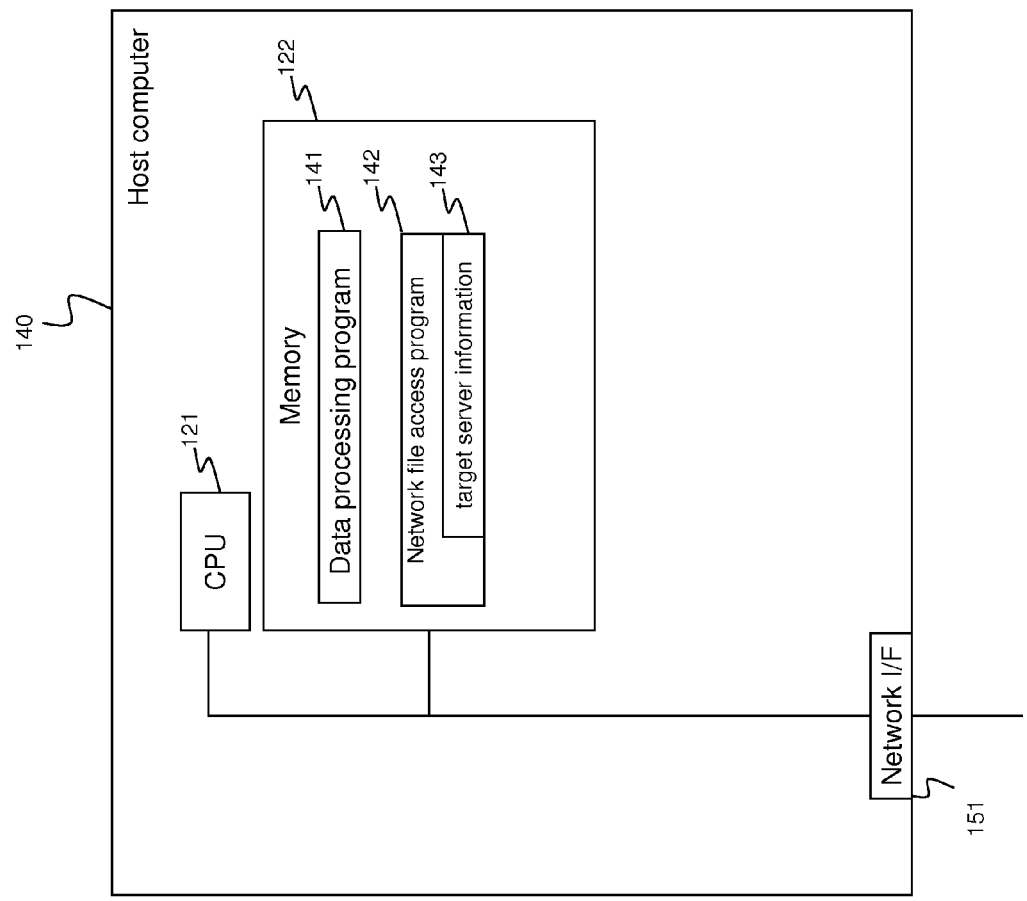

The host computers 140 are clients of the file servers 120 and 130. As seen in FIG. 1(d), the host computers 140 each have a data processing program 141 and a network file access program 142 in its memory 122. The data processing program 141 is a program processing data in external file servers as the users of this information system 110 order it to process data. The network file access program 142 is a program issuing file I/O to external file servers to read or write data on the file servers. The target server information 143 specifies the target file server and their filesystems to issue file I/O requests. For example, this information 143 includes one or more of computer name of file servers, IP (Internet Protocol) address, port number, or filesystem name. The host computers 140 issue file I/O by using the network interface 151 via the file network 150.

B. File-Level Hierarchical Storage Management

HSM (Hierarchical Storage Management) is a technique to use a plurality of storage media with different characteristics. A storage system capable of HSM manages data location automatically so that the users do not need to be aware specific storage media on which each data is stored. By using HSM, the users can locate data that is accessed frequently on fast but expensive storage media and data that is not accessed frequently on slow but inexpensive media. Thus, the users can reduce the total cost for storage media but obtain reasonable performance.

File-level HSM is a type of HSM. The file-level HSM technique distributes data onto different storage media on a per-file basis. Some implementations of file-level HSM can distribute data of one file to a plurality of storage media. Furthermore, other implementations of file-level HSM can locate file data onto some other external file storage system.

This embodiment focuses on the last kind of file-level HSM, which locates file data onto some other external file storage system. As mentioned above, the HSM file server 130 has such a file-level HSM functionality.

FIGS. 2(a) and 2(b) show an example of implementation of file-level HSM using the stub file technique. A "stub file" is a virtual file which does not have data of the file basically but indicates the location of the data stored on external file servers. A stub file may have a part of data or the whole data as cache. The file tree of the HSM filesystem 200 illustrates the file hierarchy of the HSM file system which the HSM file server 130 shows to the clients. The file tree 200 has root 210 and subdirectories 211, 212 and 213 and each directory has some files such as file 221, 222, 223 or 227. Each path location is indicated by the path name which is connection of each directory name and file with slashes. For example, the path name of file 221 is "/root/dirA/file1." The HSM filesystem itself can be used as a normal filesystem. The files 221, 222 and 223 are normal files so that the clients can read or write by specifying the path name such as "/root/dirA/file1," "/root/dirA/file2," and "/root/dirA/file3." The files 224, 225, and 226 are examples of the HSM feature. The HSM filesystem 200 stores some part of the data of such files in their internal storage media 132. For example, the HSM filesystem 200 stores only file name and metadata such as file creation time or access control information but not their data. Instead of having the entire data of files, the HSM filesystem stores information about the location of file data.

FIG. 2(b) illustrates an example structure of such a stub file 224. File metadata 270 stores metadata of each file. The file metadata 270 has an entry 281 showing whether the file is stub or not (normal file). If the file is stub, the file metadata 270 has corresponding stub information 271. If the file is not stub, the file metadata 270 must be filled to serve enough information 283, 284 and 285 for the filesystem users. If the file is stub, only the entry 281 and filename 282 are needed to specify the path name and the state that the file is stub or not. The other entries 283, 284 and 285 of the stub file can be stored or not because the filesystem program 124 can get such metadata by referring to the corresponding stub information 271 and external file servers. The stub information 271 shows the actual location of the file data. In this example, the stub information 271 indicates the location by specifying the external server name 286, filesystem name 287 in the external file server, and path name 288 on the filesystem. The actual file does not have to have the same path name as that of the HSM filesystem. For example, the stub file 224 has the path name "/root/dirB/file4" but the actual file 246, which is stored in filesystem A 231, is referred to as "/root/dirD/file10." The file metadata 270 can have plural pieces of stub information 271 per a part of file data. This enables the distribution of file data among file servers and storage of only some part of data onto the external file servers. Even if the file is stub, the HSM file server 130 can keep a part of the file data or whole data as cache in the internal storage media 132 to reduce communication with the external file servers for faster response.

The HSM file server 130 can convert the file to the stub and vice versa by "recall" and "migration." The "recall" is a process to read actual file data from the filesystem that the stub information specified via the backend network 152. After reading whole data, the HSM file server 130 can replace the stub with the whole file. The "migration" is an opposite process to copy the file data to an external file server, make stub information, and convert the file to stub via the backend network 152.

A directory 213 "/root/dirC" can be handled as stub files. In this situation, the HSM filesystem 200 may have no information about the files 227, 228, and 229 underneath. When the clients access files underneath the directory 213, the HSM filesystem 200 acts to have files 227, 228, and 229 actually stored in directory 254, which is in filesystem B 232 because the directory 254 has such three files 247, 248 and 249.

Figure 3A:
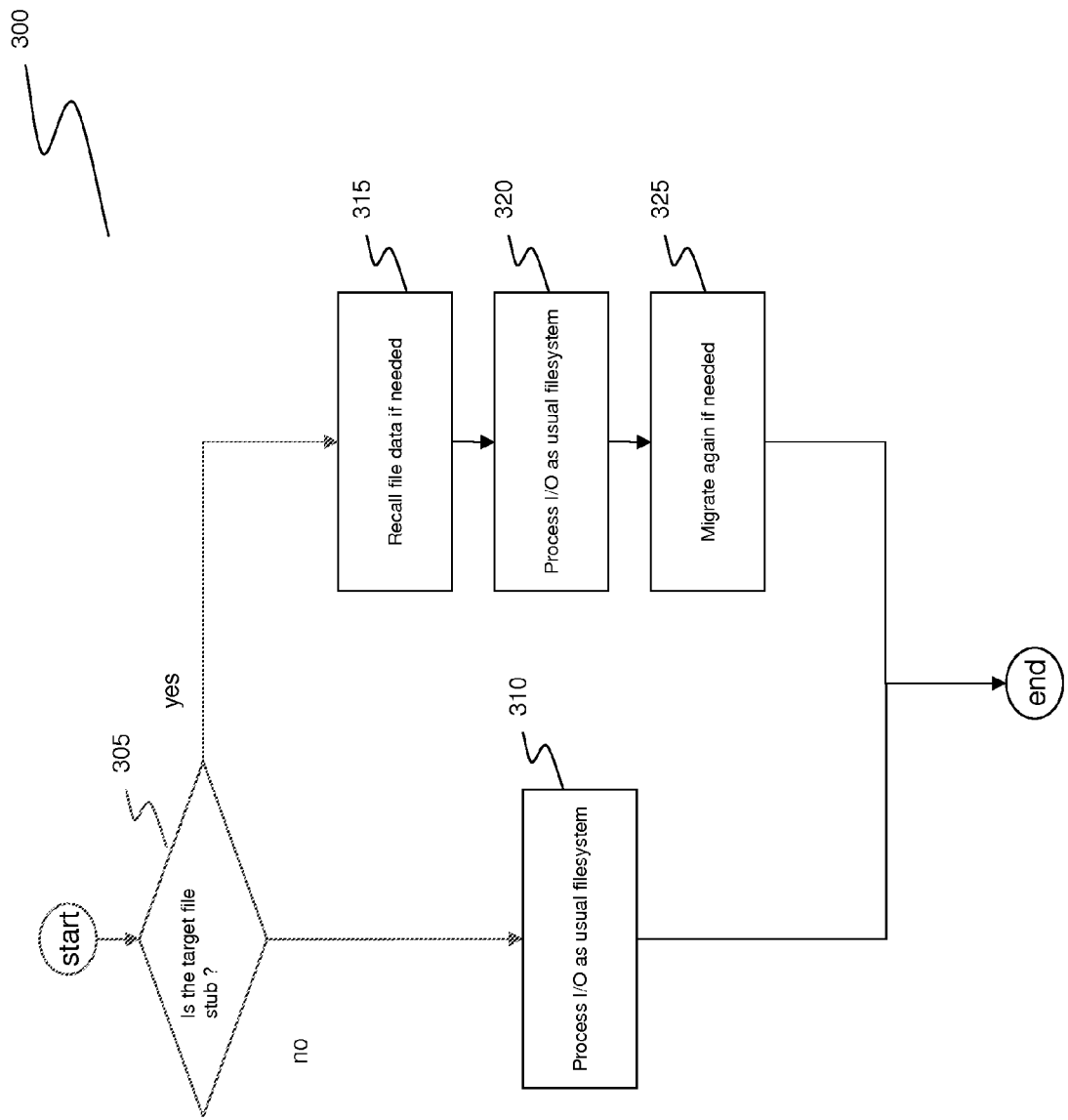
FIG. 3(a) illustrates an example of a process flow that the filesystem program and HSM program perform when the HSM file server receives a file I/O request.

FIG. 3(a) illustrates an example of a process flow 300 that the filesystem program 124 and HSM program 126 perform when the HSM file server 130 receives a file I/O request. First, the HSM file server 130 looks up information to ascertain whether the requested file is stub or not (step 305). If the file is not stub, the HSM file server 130 processes the request as a normal file server (step 310). If the file is stub, the HSM file server 130 recalls the file data via the backend network 152, if needed (step 315). If the clients request "read" I/O and the HSM file server, the HSM file server 130 has to recall data because the HSM file server 130 has no actual data. When the clients overwrite an existing file, the HSM file server 130 does not have to recall data because the clients send the data. "Do recall or not" depends on operation type (read or write), data range, and users policy. After the recall, the HSM file server 130 processes the I/O request as usual (step 320). Finally, the HSM file server 130 may migrate the file to the external server again (step 325).

Figure 3B:
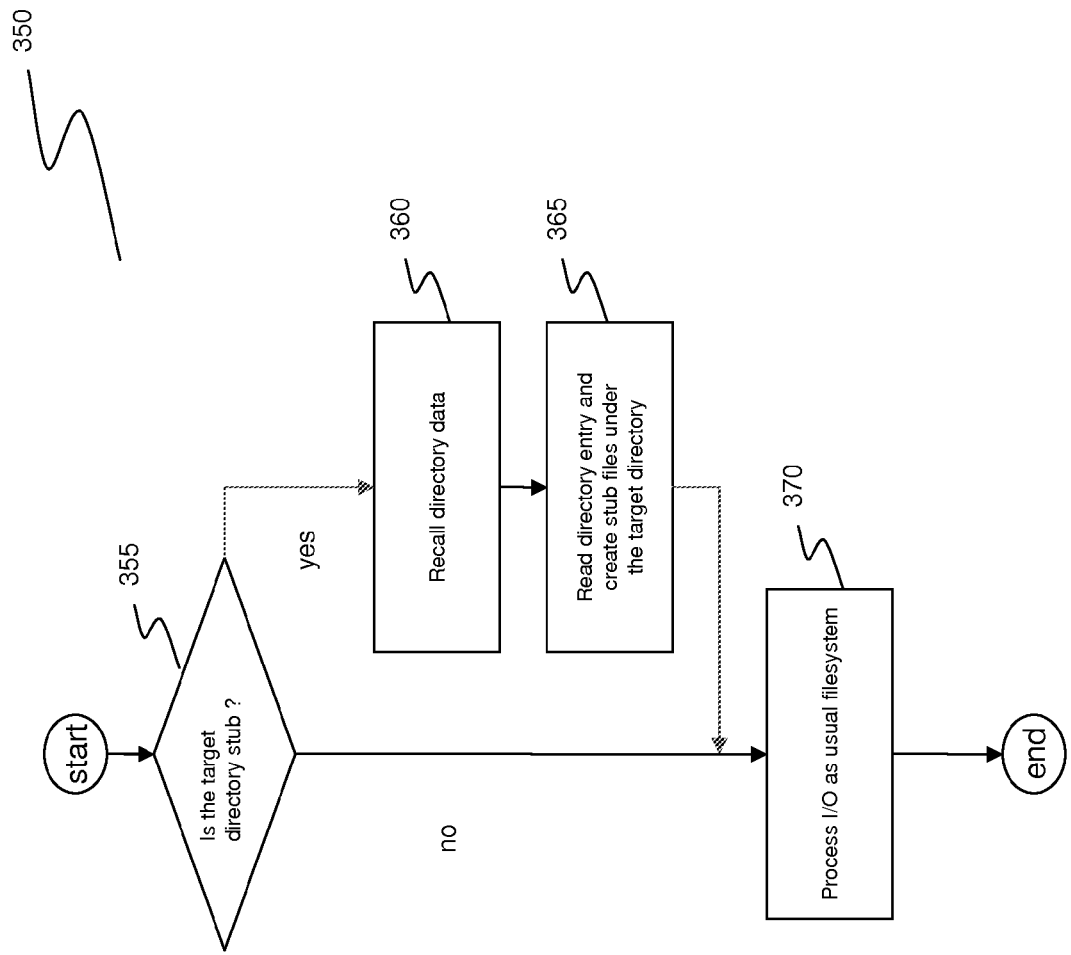
FIG. 3(b) illustrates an example of a process flow that the file system program and HSM program perform when the HSM file server receives an I/O request for directories.

FIG. 3(b) illustrates an example of a process flow 350 that the file system program 124 and HSM program 126 perform when the HSM file server 130 receives an I/O request for directories. First, the HSM file server 130 looks up to ascertain whether the requested directory is stub or not (step 355). If the directory is stub, the HSM file server 130 recalls the directory entry data via the backend network 152 (step 360). After that, the HSM program 126 creates stub for files under the directory by reading directory entry and metadata in the existing file server 120 if needed (step 365). By step 360 and step 365, the HSM program 126 has information about files under the directory and the clients can look up these files. Now the directory is not stub so that the HSM program 126 processes the request as a normal filesystem (step 370).

By these I/O flows 300 and 350, the HSM file server 130 hides external file servers for the clients so that the clients can access files among the file servers 120 by just accessing a single HSM file server 130. When the client issues an I/O request for files whose parent directories are stub, the HSM program 126 recalls such parent directories according to the flow 350 to access the target file.

C. Data Synchronization and File Server Transition

When the clients already use the existing file server and consider switching to the newer file server, the data must be synchronized between the old and new file servers. This embodiment illustrates how to make the transition before completion of synchronization with file-level HSM features. This embodiment uses file-level HSM not as the original purpose, which is to distribute data among storages, but for switching file servers. We assume that the users switch from the existing file server 120 to the new HSM file server 130. At first, the users set up the HSM file server 130 but the HSM file server 130 has no data.

FIG. 4 illustrates an example of a process flow for data synchronization and file server switching according to the first embodiment. First, the HSM program 126 creates stub information (step 410). The data synchronization program 127 directs the HSM file server 130 and CPU 121 on it to traverse the filesystem of the existing file server 120 via the backend network 152. Then, the data synchronization program 127 creates the same file tree on filesystem on the HSM fileserver 130 but all files are stub and do not have data. This process can be done faster than copying whole data because this process does not require data copy. Another implementation which means that the data synchronization program 127 creates only one stub of root directory is also available too. This implementation finishes faster because the data synchronization program 127 has only to look up the root directory. Thus, the users change the configuration of the host computers 140 to switch the I/O request from the existing file server 120 to the new HSM file server 130 by changing their target server information 143 (step 420). After that, all file I/O requests from the host computers 140 are sent to the new HSM file server 130. The data synchronization program 127 checks if the HSM file server 130 has any stub files (step 430). If it does, the data synchronization program 127 recalls data from the existing file server 120 (step 440). After the HSM file server 130 recalls all data and has no stub files, the synchronization is finished and the existing file server 120 is now useless so that the users can disconnect, shut down, and remove the existing file server 120 physically (step 450).

Steps 430 and 440 take much time because step 440 reads all data in the existing file server 120. Thus, the users can perform these steps 430 and 440 at any time or periodically. For example step 440 is done at night because users can expect the clients will hardly use the information system 110. Even if the host computers 140 issue I/O requests to the new HSM file server 130 during step 440, the HSM file server 130 can perform well because the HSM file server 130 handles stub according to the process flow 300. Using these programs, flow and techniques, the users' business does not need to stop for a long time to wait for synchronization and can continue in spite of incompleteness of synchronization.

Second Embodiment

Data synchronization via the backend network 152 takes much time, especially if the file storages 120 and 130 are distant, because generally the bandwidth of the network becomes less as the distance becomes longer. There is another synchronization method that the users can use to add storage media 132 into the file server 120, copy data among the storage media 132 internally, carry these media physically, install the media into the new HSM file server 130, and copy data among the media 132 in the new server 130. This method is effective, especially when the bandwidth of the backend network 152 is much lower than that of the internal copy among the storage media 132.

However, a problem remains that the physical transfer and installation of the storage media 132 take much time, even if these processes are much faster than the completion of synchronization via the backend network 152. The users can continue their business during the synchronization. When data synchronization to the new file server 130 is finished, some part of the data is old because the users' business overwrites data on the existing file server 120 during the synchronization.

This embodiment aims to clear such a problem with the file-level HSM technology and enable the users to continue their business after data synchronization, though not truly completed synchronization. We assume most of the data among the existing file server 120 and the new HSM file server 130 are synchronized but some files which are overwritten during data synchronization are not synchronized. The existing file server 120 stores the latest data and the new HSM file server 130 stores the old data.

A. File-Level Hierarchical Storage Management with Latest Flag and Timestamp

FIG. 5 illustrates an example of the metadata 500. The metadata 500 has an additional entry 512 as compared to the metadata example 270 of FIG. 2(b). This entry 512 stores a Boolean flag specifying whether the file is latest or not. Furthermore, the entry 514 "modification timestamp" is necessary for this embodiment. The "modification timestamp" is a popular metadata entry and many popular filesystems (ext3, NTFS, XFS) support it. This embodiment uses the same stub information 271 as in FIG. 2(b).

Figure 6:
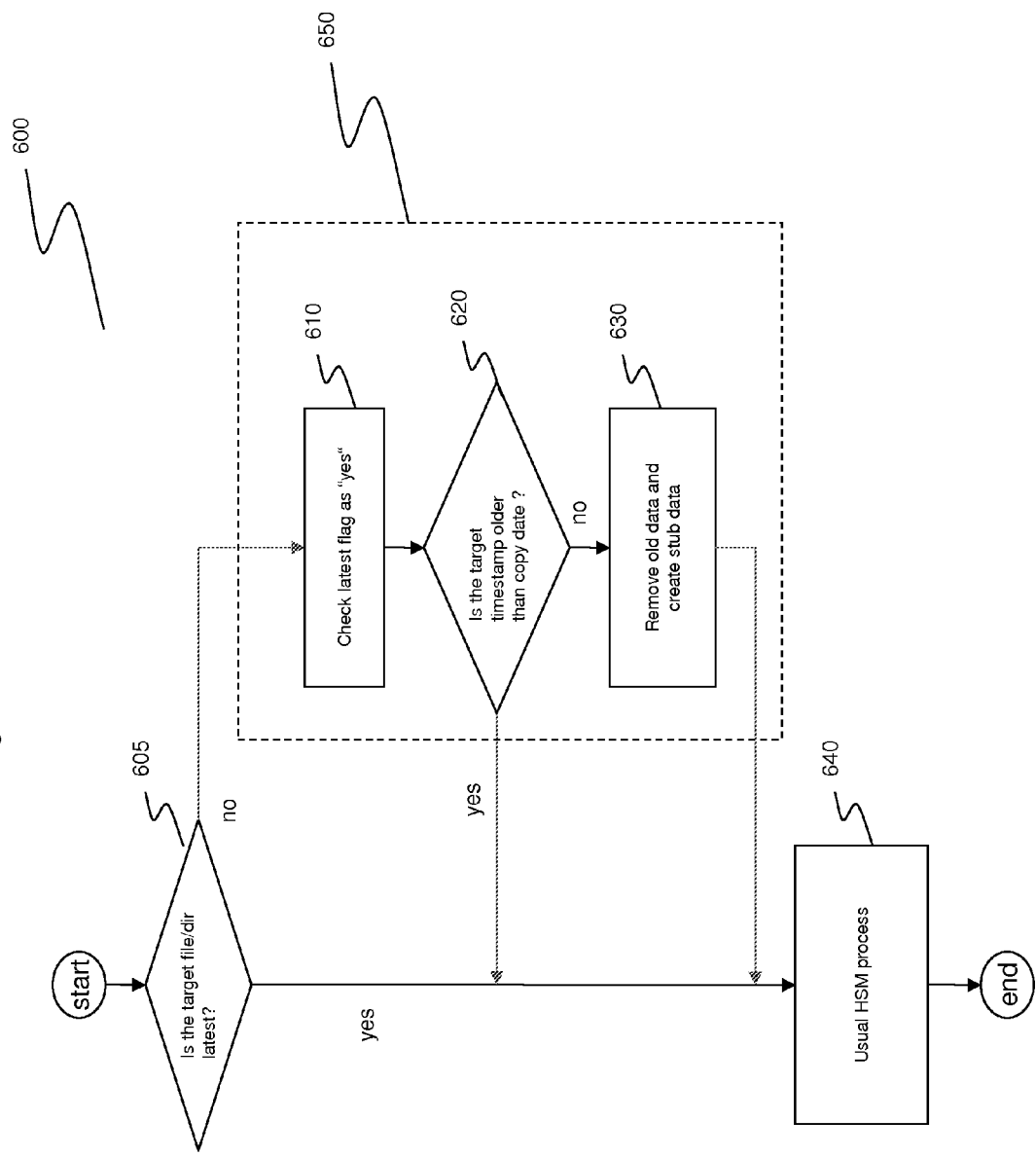
FIG. 6 illustrates an example of a process flow that the filesystem program and HSM program perform when the HSM file server receives an I/O request.

FIG. 6 illustrates an example of a process flow 600 that the filesystem program 124 and HSM program 126 perform when the HSM file server 130 receives an I/O request. At first, the HSM program 126 checks the latest flag 512 of the target file (step 605). If the flag 512 is yes, the target file or directory is already synchronized between file systems and hence the HSM program 126 proceeds to step 640. If not, the target file or directory may be non-synchronized and hence the HSM program 126 performs a synchronization process as follows. The HSM program 126 checks the latest flag as "yes" (step 610). Then, the HSM program 126 checks the timestamp of the target file or directory that has the same pathname the clients specify and is in the existing file server 120, to determine whether it is older than the copy date timestamp 128 or not (step 620). An older timestamp indicates that the file or directory is not overwritten after data copy so that the file or directory is already synchronized. A newer timestamp means that the file or directory was overwritten after data copy so that synchronization is needed. The HSM program 126 removes the old data of the target file or directory in the new HSM file server 130 and creates stub data in the server 130 by reading metadata in the existing file server 120 (step 630). After these steps 605, 610, 620 and 630, the target file or directory is synchronized or stored as stub so that the usual HSM process 300 or 350 can be executed (step 640). This process flow 600 enables to keep data concurrency of files or directories even if the files and directories in the existing file server 120 were overwritten during the data copy process. The sequential steps 650 including 610, 620 and 630 are "the dirty check process" and referred to as such later.

B. Data Synchronization and File Server Transition

Figure 7:
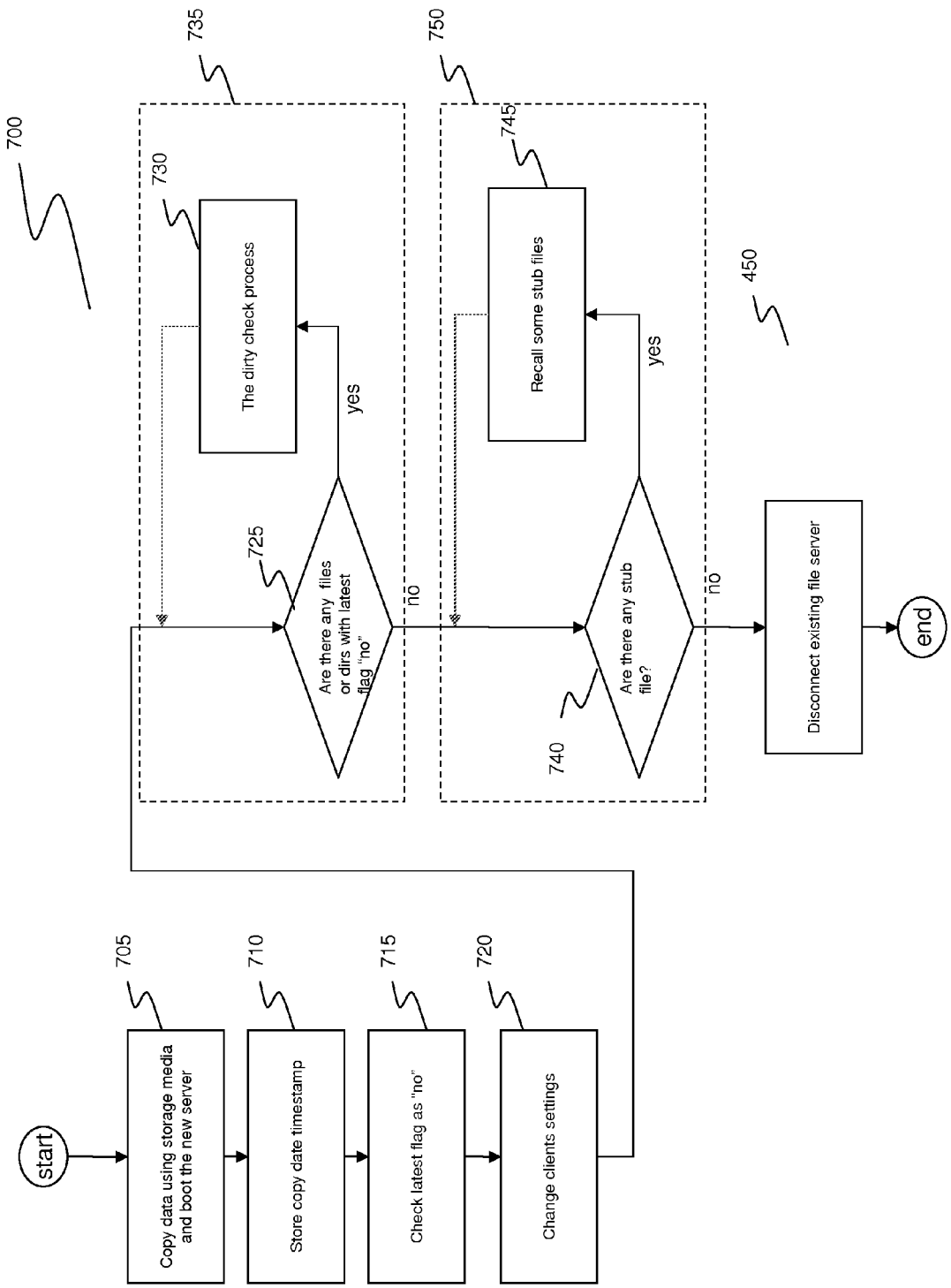
FIG. 7 illustrates an example of a process flow for data synchronization and file server switching according to the second embodiment.

FIG. 7 illustrates an example of a process flow for data synchronization and file server switching 700 according to the second embodiment. First, the users copy data by adding and carrying storage media 132 physically between the existing file server 120 and the new HSM file server 130, and boot the new HSM file server 130 after the copy was completed (step 705). This may take much time, even it is shorter than sending all data via the backend network 152, because physical setup and transfer of media are needed. The users' business continues during this step 705 and some files in the existing file server 120 may be overwritten. Then just after booting of the new HSM file server 130, the user or the data synchronization program 127 stores the copy date timestamp 128 in the new HSM file server 130 (step 710). This timestamp 128 shows when the users copied data from the existing file server 120. The users can specify this timestamp 128 manually or the data synchronization program 127 can specify it by traversing all files and directories in the new HSM file server 130 and looking up the latest timestamp of these files and directories. Then, the data synchronized program 127 traverses all files and directories and checks the latest flag 512 of each file and directory as "no" (step 715). This means that the file or directory has a probability of being not synchronized. Steps 710 and 715 are independent and can be performed in parallel. After steps 710 and 715, the HSM file server 130 is ready for file I/O so that the users change the clients' configuration to issue I/O requests to the new HSM file server 130 (step 720 which is similar to step 420). Then the data synchronization program 127 executes the dirty check block 735 including step 725 and step 730. The data synchronization program 127 traverses files and directories in the new HSM file server 130 (step 725). While the data synchronization program 127 finds the files or directories with "no" latest flag 512, the program 127 executes the dirty check process (step 730). The dirty check process 730 includes steps 610, 620 and 630 as mentioned above. This dirty check block 735 checks and deletes all un-synchronized data in the new HSM file server 130. The data synchronization program 127 also executes a data recall block 750 including steps 740 and 745. Step 740 is the same as step 430 and step 745 is the same as step 440 of FIG. 4. This data recall block 750 does real data synchronization. The dirty check block 735 and data synchronization block 750 must be done sequentially for each file or a directory but these blocks 735 and 750 can be done for separate files and directories in parallel for faster synchronization.

Using these programs, flows, and techniques, the users' business does not need to stop for a long time to wait for synchronization but can continue in spite of incompleteness of synchronization. Furthermore, the synchronization with storage media transfer can be done faster than that only with the backend network 152.

Third Embodiment

Figure 8C:
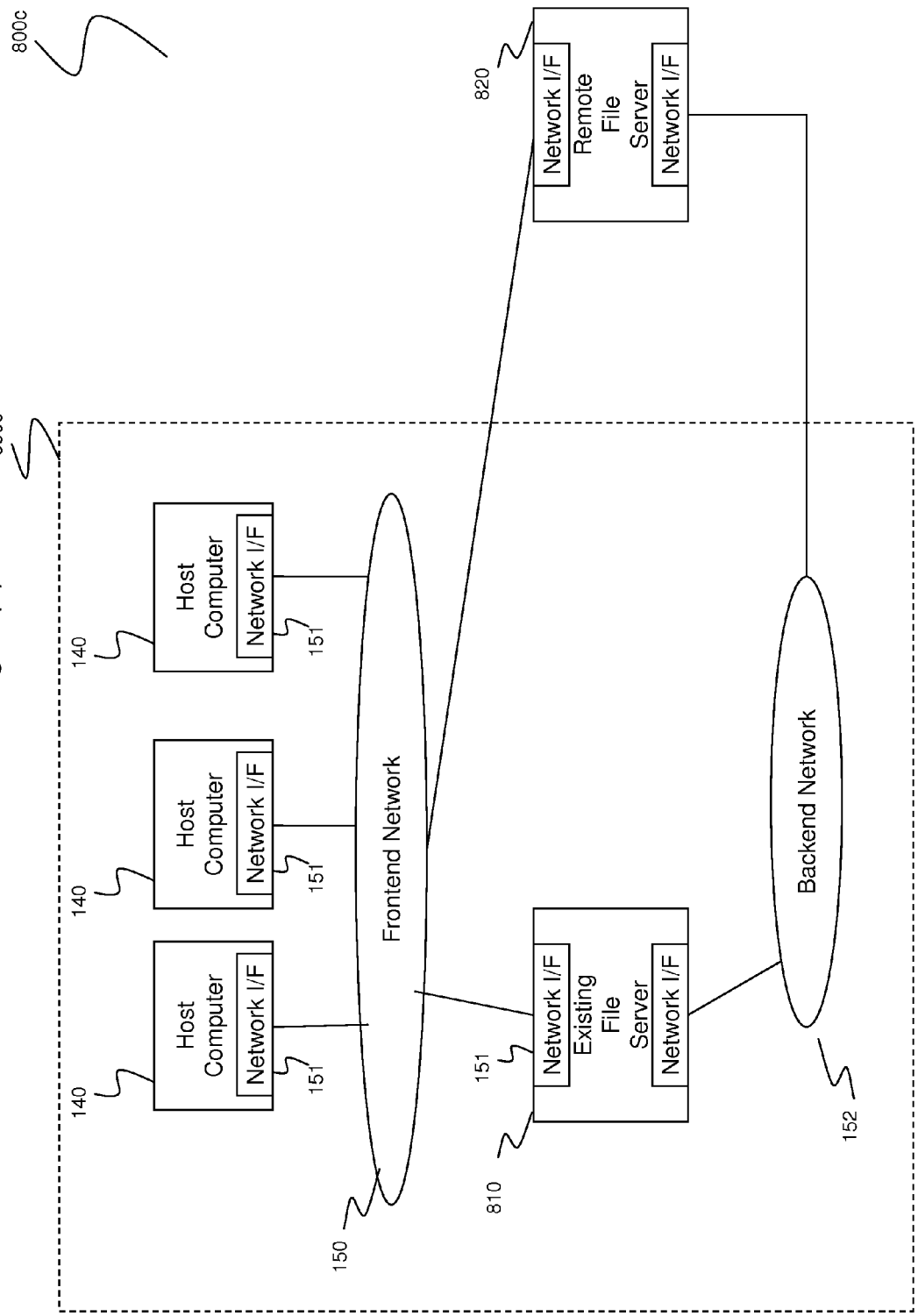
FIGS. 8(a), (b), and (c) show an example of the information system overview in which the method of this invention is not applied.
FIGS. 8(d) and (e) show an example of the information system overview in which the method and apparatus of the invention may be applied according to the third embodiment.

FIGS. 8(a), (b), and (c) show an example of the information system overview 800 in which the method of this invention is not applied. As seen in FIG. 8(a), the local information system 850a comprises the existing file server 810 which is the same as the file server 120 of FIG. 1(a), host computers 140, and frontend network 150. The information system overview 800a is made of a single local information system 850a. As a result, a disaster such as earthquake or power blackout stops the local information system 850a and causes a loss of data stored in the existing file server 810.

The information system overview 800b includes a remote file server 820, as seen in FIG. 8(b). The host computers 140 in the local information system 850b issue file I/O requests to the remote file server 820. The remote file server 820 is the same as the file server 120 but located distantly from the local information system 850b so that the remote file server 820 remains unaffected by disaster and does not lose the users' data. At this point, the information system overview 800b is disaster resistant.

The information system overview 800b has two problems. First, file access performance of the system 800b is worse than that of the system 800a because of a loss of throughput and latency by the distance. The second problem arises in the transition from the system 800a of FIG. 8(a) to the system 800b of FIG. 8(b). When users of the information system overview 800a want to transit their system 800a to the disaster resistant system 800b, data in the existent file server 810 must be transferred to the remote file server 820. This data transfer takes much time because of the network bandwidth and the distance between the local information system 850a and the remote file server 820. The users must manage the information system 800c of FIG. 8(c) intermediately for a long time and cannot write data in the existing file server 810 during the transfer to synchronize data between file servers 810 and 820.

FIGS. 8(d) and (e) show an example of the information system overview in which the method and apparatus of the invention may be applied according to the third embodiment. The information system 800e of FIG. 8(e) includes a remote data protection pair 860 comprising a HSM file server 130 in the local information system 850e and a remote file server 820. This system 800e shows the overview after data transfer. The information system 800d of FIG. 8(d) shows the overview during data transfer. This information system 800d includes both the existing file server 810 and remote data protection pair 860.

This remote data protection pair 860 solves the first problem because the HSM file server 130 behaves as cache of the remote file server 820 and lessens long latency caused by the distance.

The data synchronization and file server transition method solves the second problem. When the clients using the existing file server consider switching to the remote data protection pair 860, the data must be synchronized between the old existent and new remote file servers. This embodiment illustrates how to transition the file servers. This embodiment uses file-level HSM not for the original purpose, which is to distribute data among storages, but for the switching of file servers. We assume that the users switch from the existing file server 810 to the remote data protection pair 860. At first, the users set up the HSM file server 130 but the HSM file server 130 has no data.

Figure 9:
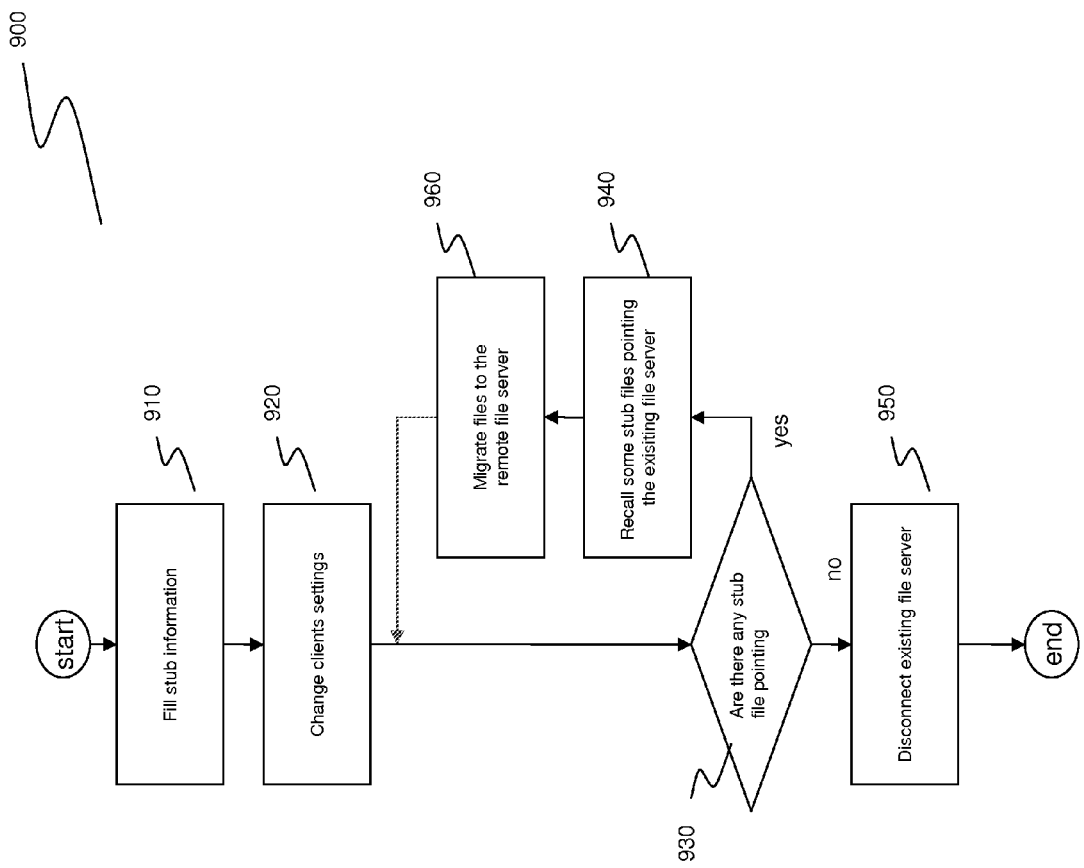
FIG. 9 illustrates an example of a process flow for data synchronization and file server switching according to the third embodiment.

FIG. 9 illustrates an example of a process flow for data synchronization and file server switching 900 according to the third embodiment. This flow can be applied after the users installed the remote data protection pair 860 as shown in the information system 800*d*. First, the HSM program 126 creates stub information (step 910). This is the same as step 410 in the process flow 400 of FIG. 4. Then, the users change the configuration of the host computers 140 to switch the I/O request from the existing file server 810 to the HSM file server 130 (step 920). This step is the same as step 420 in the flow 400. After that, all file I/O requests from host computers 140 are sent to the HSM file server 130. The data synchronization program 127 checks if the HSM file server 130 has any stub files pointing to the existing file server 810 (step 930). If it does, the data synchronization program 127 recalls data from the existing file server 810 (step 940) which is similar to step 440 of the flow 400. The data synchronization program 127 migrates files to the remote file server 820 (step 960). In this process flow 900, step 940 is the most important and step 960 is not mandatory because it is acceptable to store data in either the HSM file server 130 or the remote file server 820. Step 960 also can be processed much after the step 940. After the HSM file server 130 recalls all data in the existing file server 810, the synchronization is finished and the existing file server 810 is now useless so that the users can disconnect, shutdown, and remove the existing file server 810 (step 950). The information system 800*e* of FIG. 8(*e*) shows an overview of the system 800*d* of FIG. 8(*d*) after application of the flow 900.

Steps 930 and 940 take much time and step 960 takes even more time because step 960 requires data transfer to the remote file server 820. As such, the users can carry out these steps 930, 940, and 960 at any time or periodically. For example, step 960 is done at night when the users can expect the clients hardly use the information system 800*d*. Even if the host computers 140 issue I/O requests to the new HSM file server 130 during steps 930, 940 and 960, the HSM file server 130 can process well because the HSM file server 130 handles stub similar to the process flow 300 of FIG. 3(*a*), and recalls the correct files from either the existing file server 810 or the remote file server 820. Using these programs, flows, and techniques, the users' business does not need to stop for a long time to wait for data synchronization and can continue in spite of incompleteness of synchronization.

During the process flow 900, the data of files already recalled from the existing file server 810 and migrated to the remote file server 820 and not overwritten after migration is stored on both file servers 810 and 820. In this situation, the HSM file server 130 can recall data from the existing file server 810 even if the stub points to the remote file server 820. Recalling from the existing file server 810 results in faster recall performance because it does not require data transfer via a long distance.

Fourth Embodiment

The fourth embodiment combines features of the second and third embodiments. More specifically, the fourth embodiment uses the physical media based copy and timestamp based synchronization described in connection with the second embodiment for a situation as illustrated in the system 800*d* of FIG. 8(*d*). For example, the fourth embodiment will employ the process flow 700 of FIG. 7 (second embodiment) but the data recall block 750 is replaced by the corresponding steps 930, 940, and 960 of FIG. 9 (third embodiment).

Of course, the system configurations illustrated in FIGS. 1 and 8 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for enabling seamless transition and data synchronization among file storage systems. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method for switching file servers from an old file server to a new file server, the old file server managing a file system which includes a plurality of directories and files, the method comprising:
    creating a stub file of a root directory of the file system in the new file server;
    switching a direction of requests, targeting to the plurality of directories and files of the file system, from the old file server to the new file server, after creating the stub file of the root directory in the new file server and before creating all of the other stub files of the plurality of directories and files in the file system;
    receiving a request at the new file server;
    checking whether the new file server has any stub files for a target of the request; and
    if the new file server has one or more stub files for the target of the request,
    recalling data corresponding to the one or more stub files for the target of the request from the old file server according to stub information indicating location of data to replace the one or more stub files with the recalled data.

2. The method according to claim 1, further comprising:
    continuing requests to the file servers during the switching, checking, and recalling.

3. The method according to claim 1, further comprising, prior to creating the stub file in the new file server:
    copying data from the old file server to a storage media and, installing the storage media containing the copied data in the new file server;
    storing in the new file server a copy date timestamp corresponding to the copying of data from the old file server to the storage media;
    checking a flag, corresponding to each file or directory in the new file server, as NO indicating that the data in the file or directory are not latest in the new file server;
    checking whether any file or directory in the new file server has a corresponding flag NO indicating that the data therein are not latest in the new file server; and
    for each file or directory with a NO flag, checking the flag as YES in the new file server, and if the copy date timestamp for data in the file or directory is older than a target timestamp of the corresponding file or directory in the old file server indicating that data of the corresponding file or directory in the old file server has been overwritten at the target timestamp which is newer than the copy date timestamp, removing data of the file or directory in the new file server and performing the creating stub files in the new file server for the file or directory.

4. The method according to claim 1, wherein an external file server is coupled with the new file server via a backend network, the method further comprising, after recalling data corresponding to the one or more stub files from the old file server having the data according to the stub information:
    migrating files of the recalled data to the external file server.

5. The method according to claim 1, further comprising:
    receiving, by the new file server, a request for a file;
    determining whether the file of the request is a stub file in the new file server;
    if the file is not a stub file and the request is not a write request, processing the request to access data in the new file server;
    if the file is a stub file and the request is not a write request, recalling data corresponding to the stub file from the old file server according to the stub information to replace the one or more stub files; and
    if the request is a write request, writing data of the write request to the new file server.

6. The method according to claim 5, wherein an external file server is coupled with the new the server via a backend network, the method further comprising:
    migrating data of the request to an external file server.

7. The method according to claim 1, further comprising:
    receiving, by the new file server, a request for a directory;
        creating one or more stub files for one or more files under the requested directory in the new file server by reading metadata from the old file server.

8. A new file server in an information system which further includes an old file server coupled with the new file server, the old file server managing a file system which includes a plurality of directories and files, the new file server comprising:
    a memory; and
    a processor configured to:
    create a stub file of a root directory of the file system in the new file server,;
    start to receive a request targeting to the plurality of directories and files of the file system,
    after creating the stub file of the root directory in the new file server and before creating all of the other stub files of the plurality of directories and files in the file system; and
    upon receiving a request targeting to the plurality of directories and files of the file system by the new file server,
    check whether the new file server has any stub files for a target of the request and,
    if the new file server has one or more stub files for the target of the request,
    recall data corresponding to the one or more stub files for the target of the request from the old file server according to stub information indicating location of data to replace the one or more stub files with the recalled data.

9. The new file server according to claim 8, further comprising:
    a storage media containing data copied from the old file server and installed in the new file server;
    wherein the memory stores a copy date timestamp corresponding to the copying of data from the old file server to the storage media;
    wherein the processor is configured, prior to creating stub files in the new file server, to
        check a flag, corresponding to each file or directory in the new file server, as NO indicating that the data in the file or directory are not latest in the new file server;
        check whether any file or directory in the new file server has a corresponding flag NO indicating that the data therein are not latest in the new file server; and
        for each file or directory with a NO flag, check the flag as YES in the new file server, and if the copy date timestamp for data in the file or directory is older than a target timestamp of the corresponding file or directory in the old file server indicating that data of the corresponding file or directory in the old file server has been overwritten at the target timestamp which is newer than the copy date timestamp, remove data of the file or directory in the new file server and create stub files in the new file server for the file or directory.

10. The new file server according to claim 8, wherein the processor is configured, after recalling data corresponding to the one or more stub files from the old file server having the data according to the stub information, to migrate files of the recalled data to an external file server.

11. The new file server according to claim 8, wherein the processor is configured, upon receiving a request for a file to:
determine whether the file of the request is a stub file in the new file server;
if the file is not a stub file and the request is not a write request, process the request to access data in the new file server;
if the file is a stub file and the request is not a write request, recall data corresponding to the stub file from the old file server according to the stub information to replace the one or more stub files; and
if the request is a write request, write data of the write request to the new file server.

12. The new file server according to claim 11, wherein the processor is configured to:
migrate data of the request to an external file server.

13. The new file server according to claim 8, wherein the processor is configured, upon receiving a request for a directory, to create one or more stub files for one or more files under the requested directory in the new file server by reading metadata from the old file server.

14. An information system comprising:
an old file server managing a file system which includes a plurality of directories and files;
a new file server; and
a backend network coupling the old file server and the new file server;
wherein the new file server is configured to create a stub file of a root directory of the file system in the new file server;
start to receive a request targeting to the plurality of directories and files of the file system, after creating the stub file of the root directory in the new file server and before creating all of the other stub files of the plurality of directories and files in the file system; and
upon receiving a request targeting to the plurality of directories and files of the file system,
check whether the new file server has any stub files for a target of the request and,
if the new file server has one or more stub files for the target of the request,
recall data corresponding to the one or more stub files for the target of the request from the old file server according to stub information indicating location of data to replace the one or more stub files with the recalled data.

* * * * *